US011244087B1

(12) United States Patent
Jalla

(10) Patent No.: US 11,244,087 B1
(45) Date of Patent: Feb. 8, 2022

(54) METHOD AND SYSTEM FOR OPTIMIZING ROOF TRUSS DESIGNS

(71) Applicant: Consulting Engineers, Corp., Reston, VA (US)

(72) Inventor: Maharaj Jalla, Great Falls, VA (US)

(73) Assignee: Consulting Engineers, Corp., Reston, VA (US)

( * ) Notice: Subject to any disclaimer, the term of this patent is extended or adjusted under 35 U.S.C. 154(b) by 0 days.

(21) Appl. No.: 16/714,703

(22) Filed: Dec. 14, 2019

Related U.S. Application Data

(60) Provisional application No. 62/912,692, filed on Oct. 9, 2019.

(51) Int. Cl.
| | | |
|---|---|---|
| *G06F 30/13* | (2020.01) | |
| *G06F 30/20* | (2020.01) | |
| *E04C 3/02* | (2006.01) | |
| *G01N 5/00* | (2006.01) | |

(52) U.S. Cl.
CPC ............... *G06F 30/13* (2020.01); *G06F 30/20* (2020.01); *E04C 3/02* (2013.01); *G01N 5/00* (2013.01)

(58) Field of Classification Search
CPC ............ G06F 30/13; G06F 30/20; E04C 3/02; G01N 5/00
USPC ............................................................ 703/1
See application file for complete search history.

(56) References Cited

U.S. PATENT DOCUMENTS

| 6,754,999 B1* | 6/2004 | Urbanczyk | ............... | E04B 1/08 |
| | | | | 52/271 |
| 2005/0044133 A1* | 2/2005 | Hashimoto | ........ | G05B 19/4097 |
| | | | | 709/201 |
| 2013/0061198 A1* | 3/2013 | Brier | ..................... | G06F 3/0481 |
| | | | | 716/139 |

OTHER PUBLICATIONS

Quimby_2007 (A Beginner's Guide to ASCE 7-05 Chapter 3-D: Dead Loads, 2007, downloaded from: https://www.bgstructuralengineering.com/BGASCE7/BGASCE7003/BGASCE700302.htm) (Year: 2007).*
Roofing_Estimator_2008 (How to Easily Measure and Estimate Your Roof indexed on Nov. 10, 2008 downloaded from: http://www.newenglandmetalroof.com/roofing-estimator-guide.html) (Year: 2008).*
MiTek_2017 (Common Error in Truss Design, Oct. 31, 2017). (Year: 2017).*
Lu_2018 (Mechanical Performance of a new I-Section Weak-Axis Column Bending Connection, Steel and Composite Structures, Jan. 2018). (Year: 2018).*

* cited by examiner

*Primary Examiner* — Brian S Cook
(74) *Attorney, Agent, or Firm* — Andrew Morabito

(57) ABSTRACT

The present invention is a computer implemented method of design a roof, the method comprising: mapping, a roof layout of a structure; identifying, a set of features of the roof layout, wherein the set of features identifies the slope and intersection of the surfaces of the roof layout; applying, a plurality of trusses over the roof layout in a predetermined orientation; generating, a profile of each of the plurality of trusses, wherein the profile is generated through the combination of the identified set of features of the roof layout and the orientation of the trusses; calculating, a weight of the roof layout based on the total weight of the trusses; and calculating, a difficulty rating of the roof layout.

18 Claims, 15 Drawing Sheets

| 50 ksi | | WEAK AXIS | | | STRONG AXIS | | |
|---|---|---|---|---|---|---|---|
| Section | Truss Spacing | weight | No. of gusset plates | No of Screw | weight | No. of gusset plates | No. of Screws |
| 362S162-33 | 2'0" | 2186 | 48 | 480 | 1651 | 33 | 330 |
| 362S162-33 | 4'0" | 2653 | 59 | 590 | 1929 | 48 | 482 |
| 362S162-43 | 2'0" | 2547 | 42 | 420 | 1918 | 27 | 272 |
| 362S162-43 | 4'0" | 3158 | 50 | 500 | 2312 | 42 | 416 |
| 362S162-43 | 2'0" | 1843 | 41 | 410 | 1396 | 26 | 260 |
| 362S162-43 | 4'0" | 2216 | 50 | 500 | 1713 | 38 | 378 |
| 362S162-54 | 2'0" | 2129.25 | 28 | 280 | 1616 | 19 | 194 |
| 362S162-54 | 4'0" | 2500 | 53 | 530 | 1961 | 30 | 302 |

FIG. 12

| Steel Grade | 50 ksi | | | | | | | |
|---|---|---|---|---|---|---|---|---|
| Thickness / grade of steel | 33 | | | | 43 | | | |
| Size of stud | 362S162 | | | | | | | |
| Truss Oriantation W and S | W | | S | | W | | S | |
| Spacing 2 ft or 4 ft | 2 | 4 EQ | 2 | 4 EQ | 2 | 4 EQ | 2 | 4 EQ |
| Total | 2186 | 1327 | 1651 | 965 | 2547 | 1579 | 1918 | 1157 |
| RT1 | 364.33 | 212.16 | 275.16 | 160.83 | 424.5 | 263.16 | 319.66 | 192.83 |
| RT2 | 364.33 | 212.16 | 275.16 | 160.83 | 424.5 | 263.16 | 319.66 | 192.83 |
| RT3 | 364.33 | 212.16 | 275.16 | 160.83 | 424.5 | 263.16 | 319.66 | 192.83 |
| RT4 | 364.33 | 212.16 | 275.16 | 160.83 | 424.5 | 263.16 | 319.66 | 192.83 |
| RT5 | 364.33 | 212.16 | 275.16 | 160.83 | 424.5 | 263.16 | 319.66 | 192.83 |
| RT6 | 364.33 | 212.16 | 275.16 | 160.83 | 424.5 | 263.16 | 319.66 | 192.83 |

| Steel Grade | | | | | | | | 50 ks |
|---|---|---|---|---|---|---|---|---|
| Thickness / grade of steel | | 33 | | | | 43 | | |
| Size of stud | | | | | 362S162 | | | |
| Truss Oriantation W and S | | W | | S | | W | | S |
| Spacing 2 ft or 4 ft | | 2 | 4 | 2 | 4 | 2 | 4 | 2 | 4 |
| | | | 2 EQ | | 2 EQ | | 2 EQ | | 2 EQ |
| Details | | | | | | | | | |
| Weight of steel (lb) | | 2186 | 1327 | 1651 | 965 | 2547 | 1579 | 1918 | 1157 |
| Gussets | | 50 | 29.5 | 25 | 19.5 | 42 | 25 | 24 | 17.5 |
| screws | | 500 | 295 | 250 | 191 | 420 | 250 | 242 | 173 |
| Savings | | | | | | | | | |
| Saving (Wt) (%) | | 0 | 39.5 | 23 | 55.3 | 15.3 | 28 | 12 | 45.5 |
| Saving (Gusset Plate) (%) | | 0 | 40.75 | 46.8 | 55.5 | 12.8 | 48.5 | 46.8 | 59.5 |
| Saving (Screws) (%) | | 0 | 40.75 | 46.8 | 55.5 | 12.8 | 48.5 | 46.8 | 59.5 |

FIG. 14

METHOD AND SYSTEM FOR OPTIMIZING ROOF TRUSS DESIGNS

CROSS-REFERENCE TO RELATED APPLICATIONS

This application is a continuation-in-part (and claims the benefit of priority under 35 USC 120) of U.S. provisional application No. 62/912,692 filed Oct. 9, 2019. The disclosure of the prior applications is considered part of (and is incorporated by reference in) the disclosure of this application.

BACKGROUND

This disclosure relates to building construction and in particular, to a method, a computer program, or a computer system for optimization the design of trusses on a structure. Different design types such as frame and back-to-back trusses are commonly used for roofing and floor applications. Frame trusses are similar to wall frames except that they have a roof-shaped profile rather than a rectangular wall shape. They have upper and lower tracks with parallel, vertically oriented stud members sandwiched between the tracks to provide structural support for the roof material.

Metal trusses are used for both commercial and residential structures. They are typically formed either from structural stud members or a combination of structural stud, non-structural stud and track members. Structural studs have cross-sectional profiles that provide them with structural stability; tracks generally have "U" shaped profiles that allow them to receive stud members fixed in a conventional. perpendicular configuration for making frame sections; and non-structural studs have profiles that give them reduced structural support but make them amenable for other functions such as receiving other studs.

Building construction is a complicated process in which the design and construction of the roof is exceptionally complicated and if done incorrectly can result in catastrophic issues with the structure or building. The roof truss is typically designed truss by truss and computer programs aid in the calculating of the span and loading of the trusses to determine if the design is possible. This may also occur in the reverse where the design of the roof is first determined, and the trusses are created to fit the design.

The roof trusses have to be designed to carry the "live" load and the "dead" load. The live load is the load of the building, the occupants and all items within the house. The dead load is the weight of the construction materials. The trusses are spaced apart at certain distance to distribute the loads equally on each truss. Usually the design is done for a standard spacing between trusses however if the trusses are checked for several different spacing between trusses then the optimum weight of the total roof trusses are achieved. This process can be lengthy and costly but is a necessity to design the roof to hand the loads.

It is desired for a program or system that is able to analyze a roof layout and generate the trusses based on the roof layout to a set of trusses at the appropriate locations and with the ideal designs.

SUMMARY

In a first embodiment, the present invention is a computer implemented method of design a roof, the method comprising: mapping, by one or more processors, a roof layout of a structure; identifying, by one or more processors, a set of features of the roof layout, wherein the set of features identifies the slope and intersection of the surfaces of the roof layout; applying, by one or more processors, a plurality of trusses over the roof layout in a predetermined orientation; generating, by one or more processors, a profile of each of the plurality of trusses, wherein the profile is generated through the combination of the identified set of features of the roof layout and the orientation of the trusses; calculating, by one or more processors, a weight of the roof layout based on the total weight of the trusses; and calculating, by one or more processors, a difficulty rating of the roof layout.

In a second embodiment, the present invention is a computer program product for design a roof layout, comprising, the computer program product comprising a computer readable storage medium having program instructions embodied therewith, the program instructions executable by a computing device to cause the computing device to: program instructions to map a roof layout of a structure; program instructions to identify a set of features of the roof layout, wherein the set of features identifies the slope and intersection of the surfaces of the roof layout; program instructions to apply a plurality of trusses over the roof layout in a predetermined orientation; program instructions to generate a profile of each of the plurality of trusses, wherein the profile is generated through the combination of the identified set of features of the roof layout and the orientation of the trusses; program instructions to calculate a weight of the roof layout based on the total weight of the trusses; and program instructions to calculate a difficulty rating of the roof layout.

In a third embodiment, the present invention is a system for creating a roof layout comprising: a CPU, a computer readable memory and a computer readable storage medium associated with a computing device; the computer program product comprising a computer readable storage medium having program instructions embodied therewith, the program instructions executable by a computing device to cause the computing device to: program instructions to map a roof layout of a structure; program instructions to identify a set of features of the roof layout, wherein the set of features identifies the slope and intersection of the surfaces of the roof layout; program instructions to apply a plurality of trusses over the roof layout in a predetermined orientation; program instructions to generate a profile of each of the plurality of trusses, wherein the profile is generated through the combination of the identified set of features of the roof layout and the orientation of the trusses; program instructions to calculate a weight of the roof layout based on the total weight of the trusses; and program instructions to calculate a difficulty rating of the roof layout.

BRIEF DESCRIPTION OF THE DRAWINGS

Referring now to the drawings in which like reference numbers represent corresponding parts throughout:

FIG. 12 depicts a table showing the analysis for a single truss for different conditions such as using different spacing of truss, different material for the truss and different member orientation of the truss members, in accordance with one embodiment of the present invention.

FIG. 13 depicts a table of the overall summary of the roof layout, in accordance with one embodiment of the present invention.

FIG. 14 depicts a table, wherein the table shows a comparison of different truss options, in accordance with one embodiment of the present invention.

DETAILED DESCRIPTION

Figure 1:
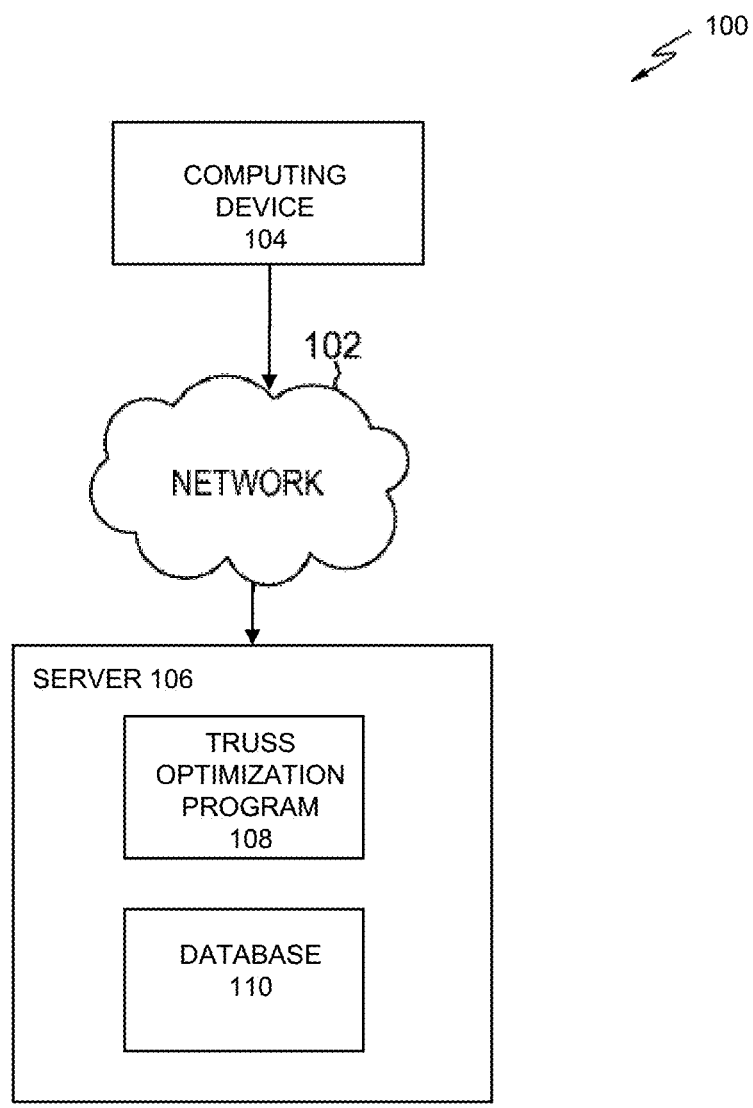
FIG. 1 depicts a block diagram depicting a computing environment, in accordance with one embodiment of the present invention.

The present invention generally relates to analyzing a building during the design phase to determine and optimize the creation of the roof design. This includes the determination and optimization of all the trusses which are required to construct the roof. The method, computer program, or computer system is able to optimize the roof trusses with respect to the weight of the trusses and the maximum load the roof can handle. By determining the weight of the trusses, this assists in determining if the weight of the roof is beyond the building maximum capacity, where the roof trusses would need to be redesigned.

When building a structure, the roof line has both aesthetic and functional aspects. The roof needs to be able to handle the elements (e.g. snow) and also have an aesthetically pleasing look. Accomplishing both of these is a complicated process in which the step of the roof Construction is the most complicated task to successfully complete to meet the aesthetic and functional aspects of the roof. The roof is made of trusses that are spaced particular distances apart from one another and have varying shapes based on the intended roof outline.

The roof trusses are designed to carry various loads and the trusses are spaced apart at certain distance to distribute the loads equally on each truss. Usually the design is done for a standard spacing between trusses however if the trusses are checked for several different spacing between trusses then the optimum weight of the total roof trusses are achieved, and this may require less trusses than the standard design. Thereby saving both on material and construction time.

The present invention uses a unique optimization feature where the roof layout is analyzed by the program. The trusses are applied to the roof layout in various setups (e.g. spacing and truss design). The trusses are individually analyzed to determine if the design is capable of handling the load.

In many modern buildings, the roof trusses are typically made of cold formed steel C sections. The trusses are created using the strong axis of the cold formed steel members or weak axis of the cold formed steel members. The program is able to use various materials or designs of the truss members to assist in the analysis of the roof design.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 depicts a block diagram of a computing environment 100 in accordance with one embodiment of the present invention. FIG. 1 provides an illustration of one embodiment and does not imply any limitations regarding the environment in which different embodiments may be implemented.

In the depicted embodiment, computing environment 100 includes network 102, computing device 104, and server 106. Computing environment 100 may include additional servers, computers, or other devices not shown.

Network 102 may be a local area network (LAN), a wide area network (WAN) such as the Internet, any combination thereof, or any combination of connections and protocols that can support communications between computing device 104 and server 106 in accordance with embodiments of the invention. Network 102 may include wired, wireless, or fiber optic connections.

Computing device 104 may be a management server, a web server, or any other electronic device or computing system capable of processing program instructions and receiving and sending data. In other embodiments, computing device 104 may be a laptop computer, tablet computer, netbook computer, personal computer (PC), a desktop computer, or any programmable electronic device capable of communicating with patient computing device 104 via network 102. In other embodiments, computing device 104 may be a server computing system utilizing multiple computers as a server system, such as in a cloud computing environment. In one embodiment, computing device 104 represents a computing system utilizing clustered computers and components to act as a single pool of seamless resources. Computing device 104 may include components, as depicted and described in further detail with respect to FIG. 1.

Server 106 may be a management server, a web server, or any other electronic device or computing system capable of processing program instructions and receiving and sending data. In other embodiments server 106 may be a laptop computer, tablet computer, netbook computer, personal computer (PC), a desktop computer, or any programmable electronic device capable of communicating via network 102. In one embodiment, server 106 may be a server computing system utilizing multiple computers as a server system, such as in a cloud computing environment. In one embodiment, server 106 represents a computing system utilizing clustered computers and components to act as a single pool of seamless resources. In the depicted embodiment optimization program 108 and database 110 are located on server 106. Server 106 may include components, as depicted and described in further detail with respect to FIG. 1.

Optimization program 108 has the unique features to take a building or structure and generate various roof designs which are mathematically possible to be built on the building or structure. The optimization program 108 is able to determine the difficulty in construction the roof as well. With the ability to generate the roof design, through the process of identifying the number of trusses, the shape of the trusses and the position of the trusses to achieve both a functional and atheistic goals of the roof design. The optimization program 108 is able to generate a plurality of different roof designs and provide optimal spacing and truss designs to mathematically handle the loads which the roof needs to be able to withstand and provide detailed drawings and layouts for each truss section.

In additional embodiments, the optimization program 108 also generates an Analysis table to show each truss weight and spacing for a plurality of different options, and how the alteration of one truss affects the other trusses. In the analysis table, the difficulty of the roof design is to determine and provides an interactive illustration or table to depict the relationship between the weight of the roof design and the difficulty of constructability. This feature is advantageous when a certain design is sought after, the user is able to understand the difficulty of creating that design to understand the benefits and detriments of the design.

In the depicted embodiment, the optimization program 108 utilizes network 102 to access the computing device 104 and to communicate with database 110. In one embodiment, optimization program 108 resides on computing device 104. In other embodiments, optimization program 108 may be located on another server or computing device, provided optimization program 108 has access to database 110.

Database 110 may be a repository that may be written to and/or read by optimization program 108. Information gathered from computing device 104 and the 1-dimensional, 2-dimensional, and 3-dimensional drawings and models as well as the requirements so that the assembly drawing in one embodiment, database 110 is a database management system (DBMS) used to allow the definition, creation, querying, update, and administration of a database(s). In the depicted embodiment, database 110 resides on computing device 104. In other embodiments, database 110 resides on another server, or another computing device, provided that database 110 is accessible to optimization program 108.

Figure 2:
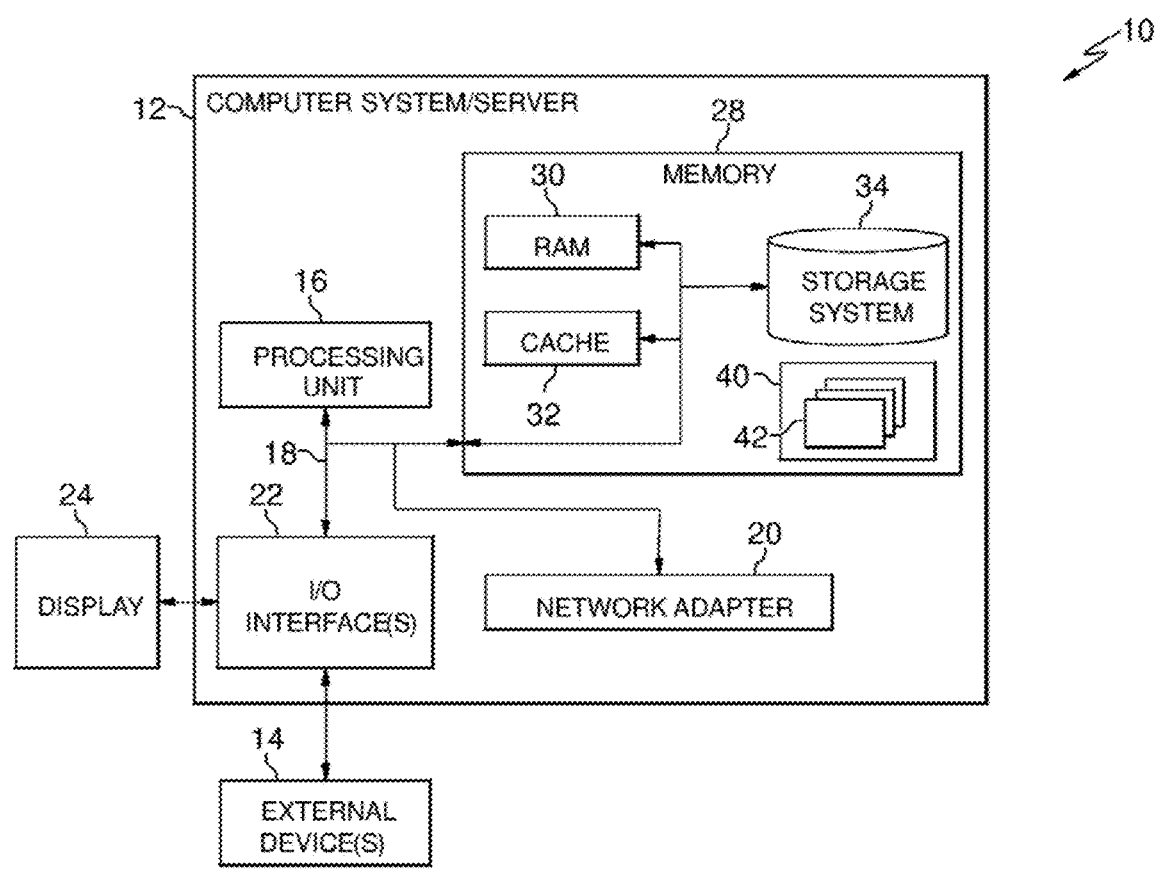
FIG. 2 depicts a block diagram depicting the internal and external components of the server and computing device of FIG. 1, in accordance with one embodiment of the present.

FIG. 2, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 2, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID systems, tape drives, and data archival storage systems, etc.

Figure 3:
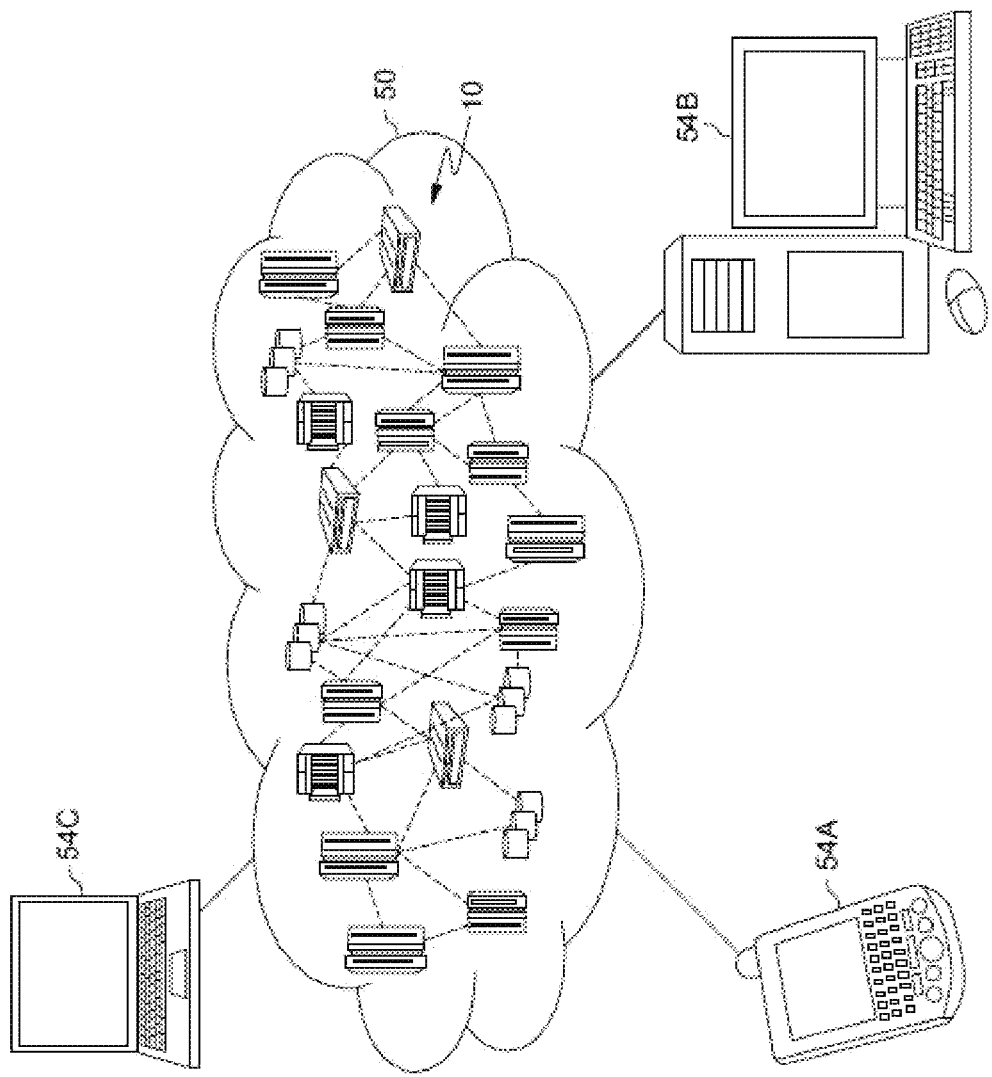
FIG. 3 depicts a cloud computing environment, in accordance with one embodiment of the present invention.

FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or additional computer systems may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-C shown in FIG. 2 are intended to be illustrative only and that computing nodes 10 and cloud computing environment 50 can communicate with any type of computerized device over any type of network and/or network addressable connection (e.g., using a web browser).

Referring back to FIG. 2, the Program/utility 40 may include one or more program modules 42 that generally carry out the functions and/or methodologies of embodiments of the invention as described herein. Specifically, the program modules 42 provides for the roof optimization, roof layout design, truss spacing and design, and load. Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
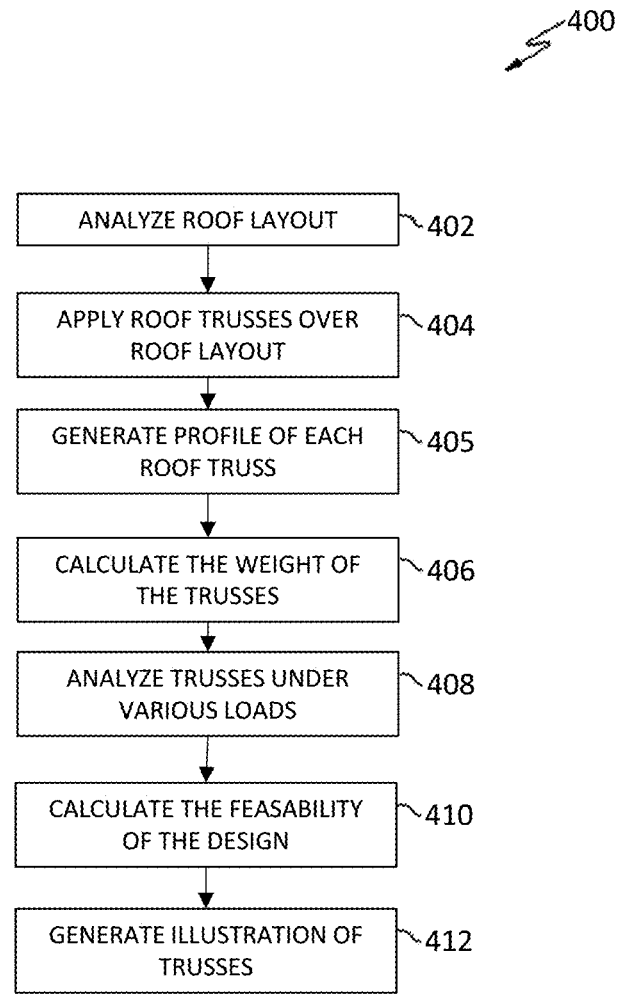
FIG. 4 depicts a flowchart of the operational steps of a method performed by a truss optimization program within the computing environment of FIG. 1, in accordance with one embodiment of the present invention.

FIG. 4 depicts flowchart 400 depicting a method according to the present invention. The method(s) and associated process(es) are now discussed, over the course of the following paragraphs, in accordance with one embodiment of the present invention. The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Figure 5:
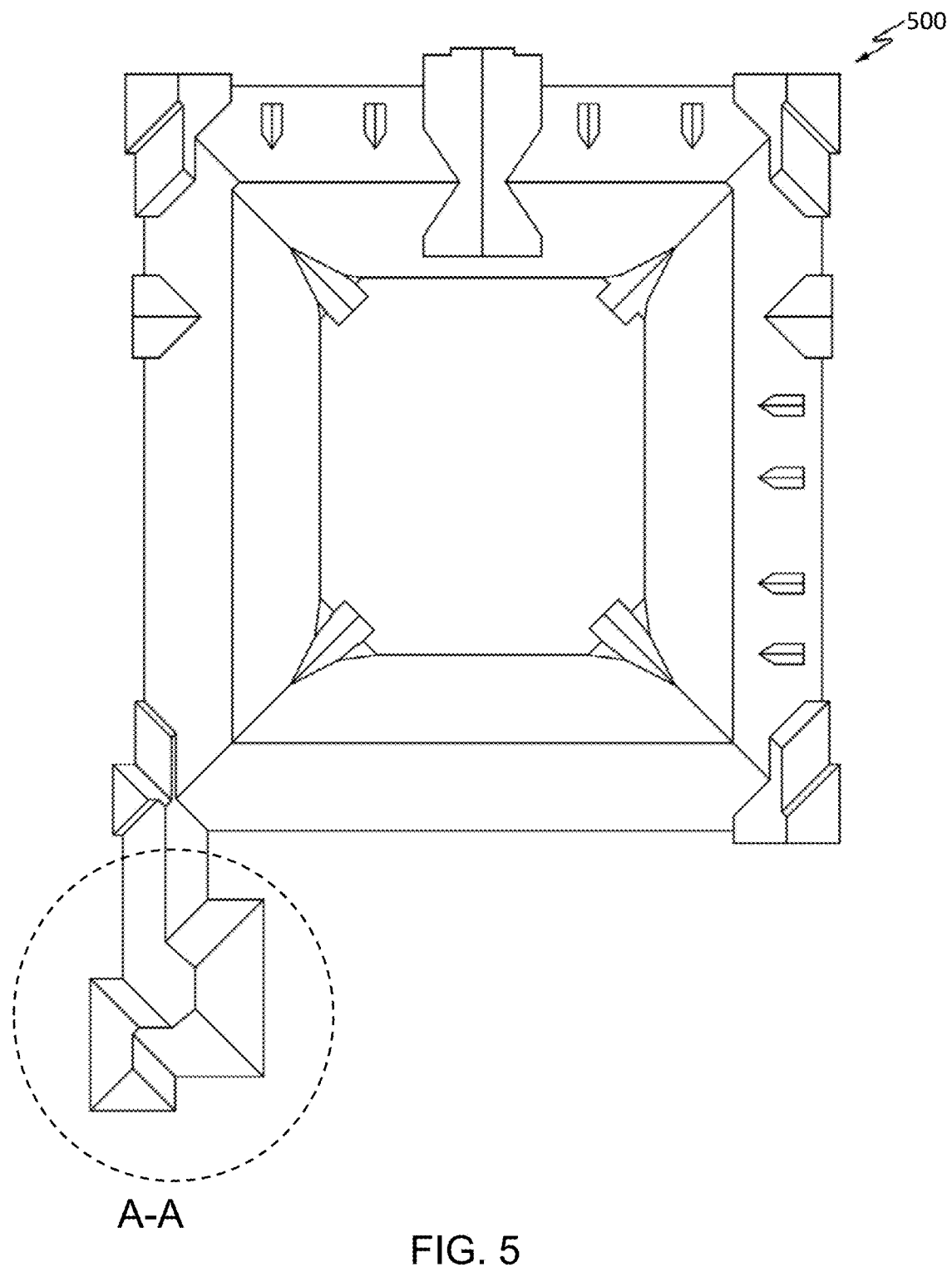
FIG. 5 depicts a roof layout of a building, in accordance with one embodiment of the present invention.
Figure 6:
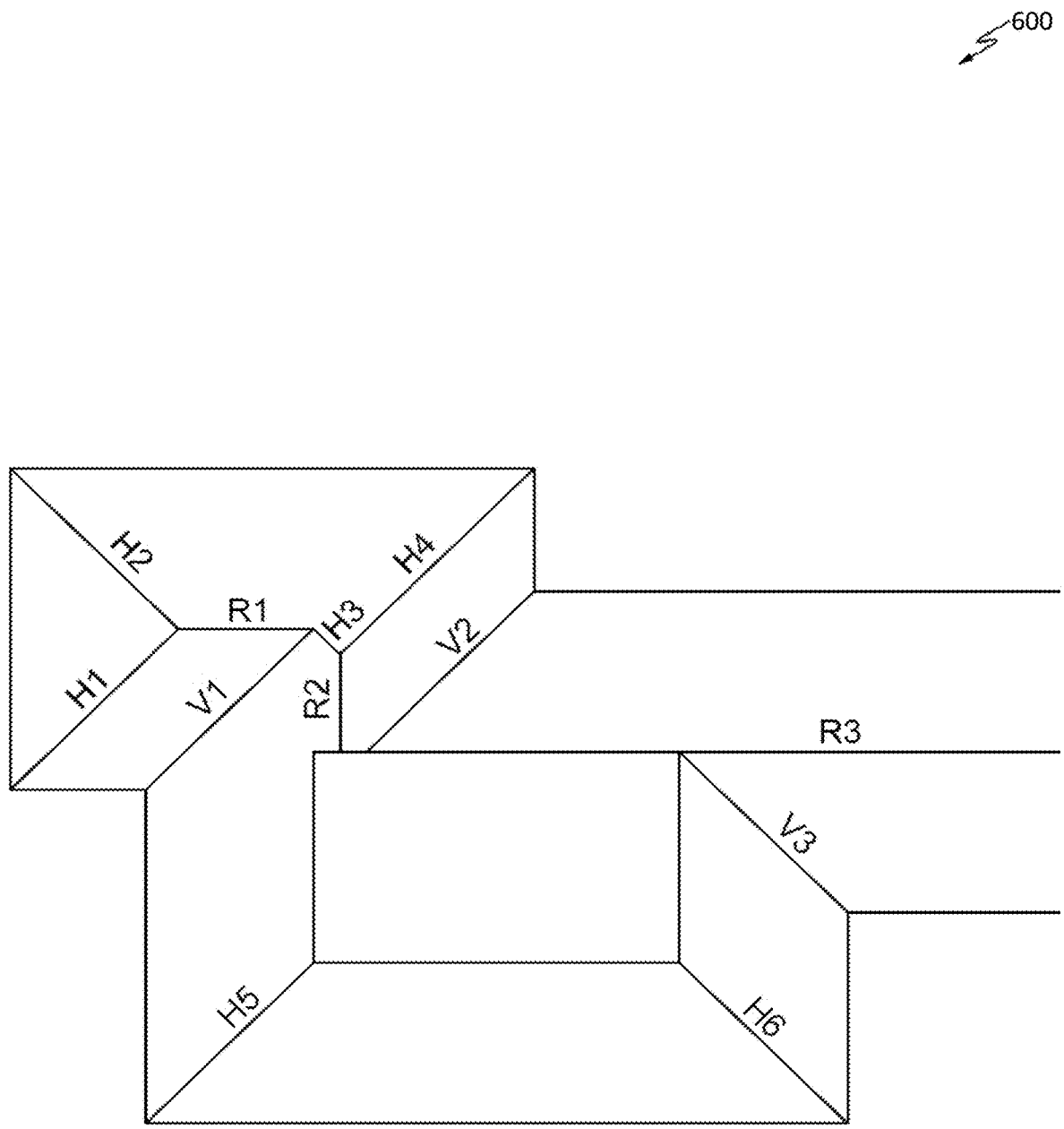
FIG. 6 depicts a section view of FIG. 5 roof layout, in accordance with one embodiment of the present invention.

In step 402, the optimization program 108 reviews the roof layout of the structure or building. The optimization program 108 receives or access the 3D model or drawings related to the roof layout of the structure or building. FIG. 5 depicts an illustration of one potential drawing which could be received of the roof layout. In additional embodiments, this image may be extracted from a 3D model or extracted from a set of drawings. The optimization program 108 analyzes the roof layout, this includes but is not limited to reviewing and understanding the ridge lines, hip lines, valley lines, peaks, valleys, and the like. As depicted in FIG. 6, a section of the roof from FIG. 5 is shown where the optimization program 108 has identified the HIP lines (H1, H2, H3, H4, H5, and H6), the Ridge lines (R1, R2, and R3) and the valley lines (V1, V2, and V3). The optimization program 108 is able to extract the line types from the 3D model or is able to calculate the line types based on machine learning or artificial intelligence based on standard or ideal roof structures or designs. In some embodiments, the optimization program 108 is able to use additional images or drawings of the structure to extract the line types and roof layout. When an artistic rendering of the roof is created, the optimization program 108 reviews the various aspects of the roof to assist in analyzing a specific roof design. In some embodiments, the optimization program 108 analyzes the roof for external boundaries to determine the limits of the roof based on the basic structure design.

Figure 7:
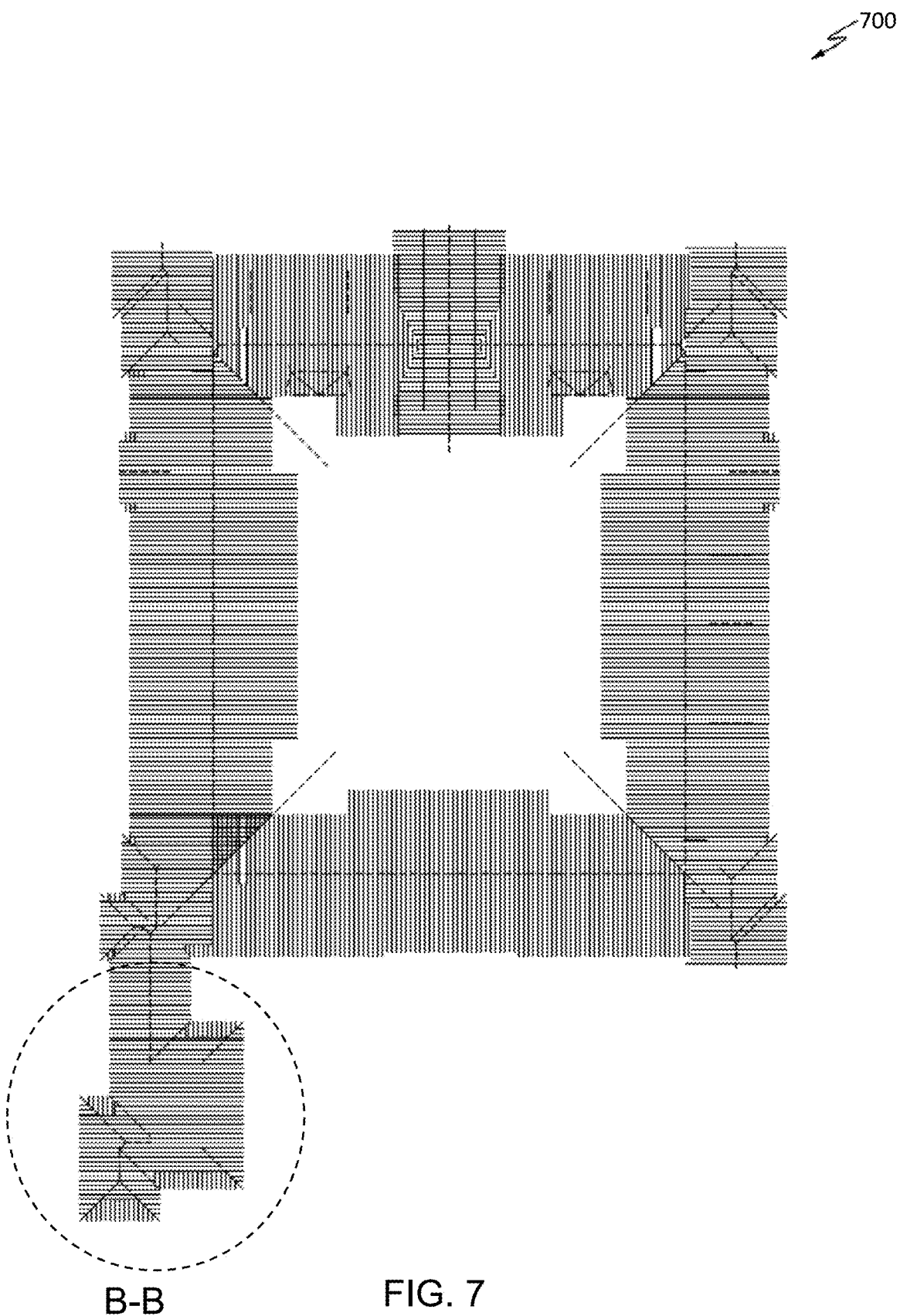
FIG. 7 depicts a detailed view of the roof layout with trusses applied to the roof layout, in accordance with one embodiment of the present invention.
Figure 8:
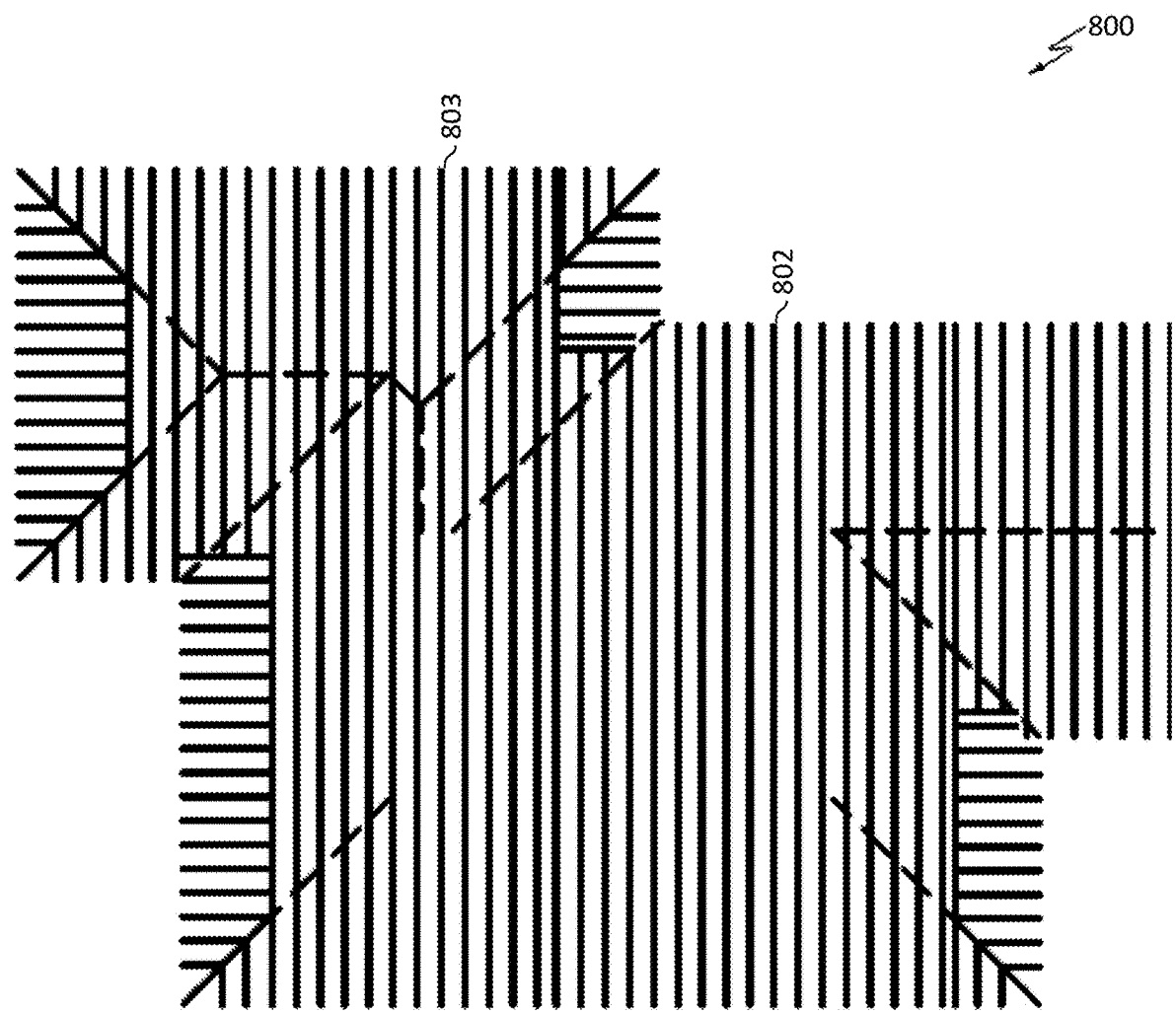
FIG. 8 depicts a section view of the roof layout from FIG. 7, in accordance with one embodiment of the present invention.

In step 404, the optimization program 108 applies roof trusses over the roof layout. Once the optimization program 108 determines the external limits and features of the roof layout which set the extremes of the trusses. The optimization program 108 then applies trusses, based on a predetermined distance between the trusses over the entire roof layout or a selected section. The optimization program 108 determines the orientation of the trusses based on the detected hip, ridge, and valley lines and known roofing styles and designs. In additional embodiments, the optimization program 108 creates a plurality of truss layouts. These designs may have limits set by either a user or by the optimization program 108 or machine learning technology to remove unlikely designs or designed that are beyond a preferred threshold. These unlikely designs are designed that would be beyond a difficulty threshold (Step 410). In some respects, the user has an interactive experience with the identification of the truss locations, by being able to manipulate aspects of the roof to meet various structural or aesthetic characteristics they wish to accomplish. The trusses may be set at a predetermined distance for a baseline process or may be set at an industry or design standard. As shown in FIG. 7, the roof trusses are applied to the roof layout from FIG. 5, where the trusses replace the lines which represented the features of the roof. The optimization records the roof layout lines determined in the previous step. The trusses are orientated based on the roof design. The optimization program 108 is able to orientate the trusses based on the roof design. As shown in FIG. 8, a section view of FIG. 7 along line B-B. The roof trusses are applied in various orientations based on the ridge lines, hip lines, and valley lines.

Figure 9:
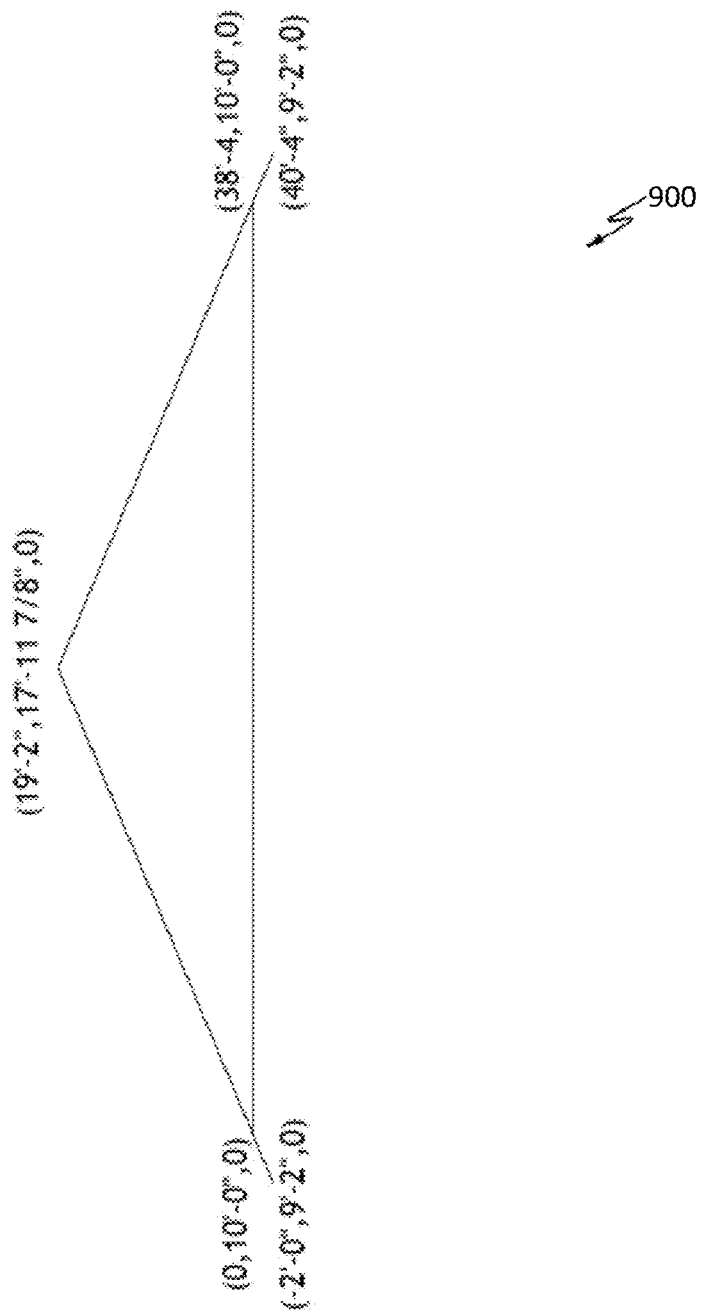
FIG. 9 depicts a truss from FIG. 8, in accordance with one embodiment of the present invention.
Figure 10:
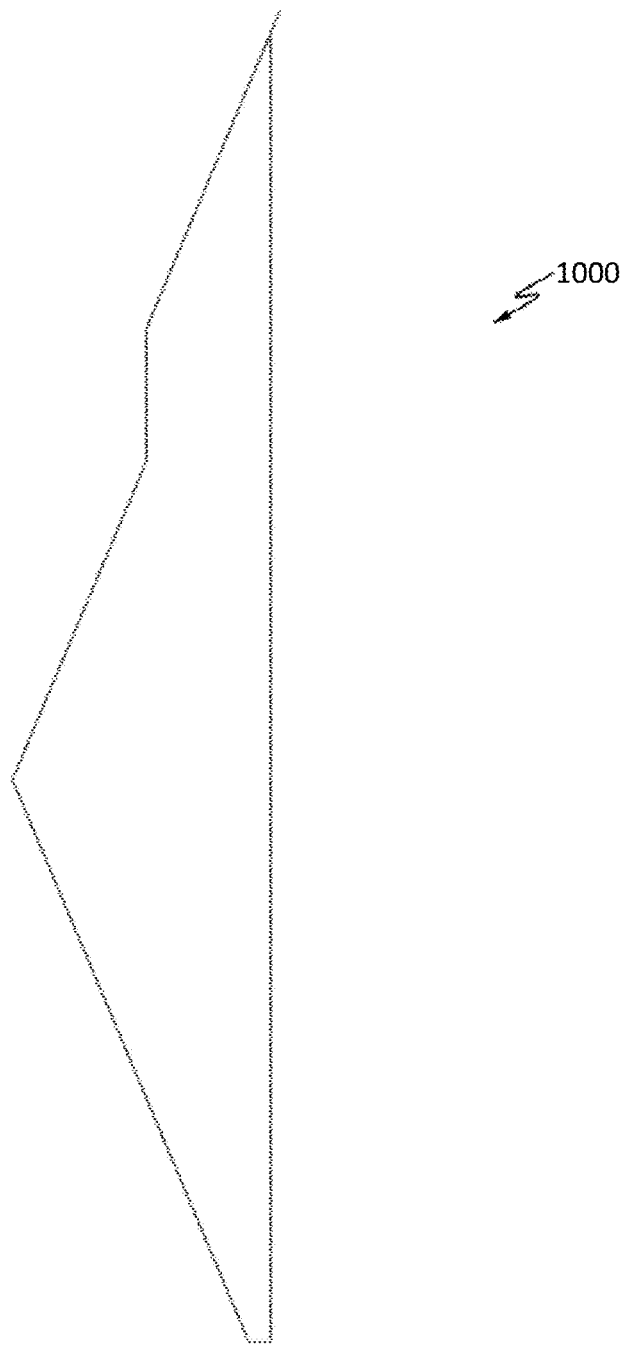
FIG. 10 depicts another truss from FIG. 8, in accordance with one embodiment of the present invention.

In step 405, the optimization program 108 generates a profile for each roof truss. With the determination of the roof layout from Step 402, and the orientation and placement of the trusses from Step 404, the optimization program 108 converges the data and creates a profile view of each truss based on the previously collected data. Examples of illustrations of trusses generated by optimization program are shown in FIGS. 9 and 10, which are extracted from trusses 802 and 803 respectively from FIG. 8. These illustrations shown the generation of the truss through the aggregation of the roof layout and the truss member. In some embodiments, the optimization program 108 is provided with incomplete data about the trusses and is able to take the known data and known standards and calculate the needed dimensions of the trusses to generate the profiles. For example, if the height of the truss is unknown, but the optimization program knows the width of the truss and the slope of the truss, the optimization program is able to calculate the height and thereby generate the profile of the truss.

Figure 11:
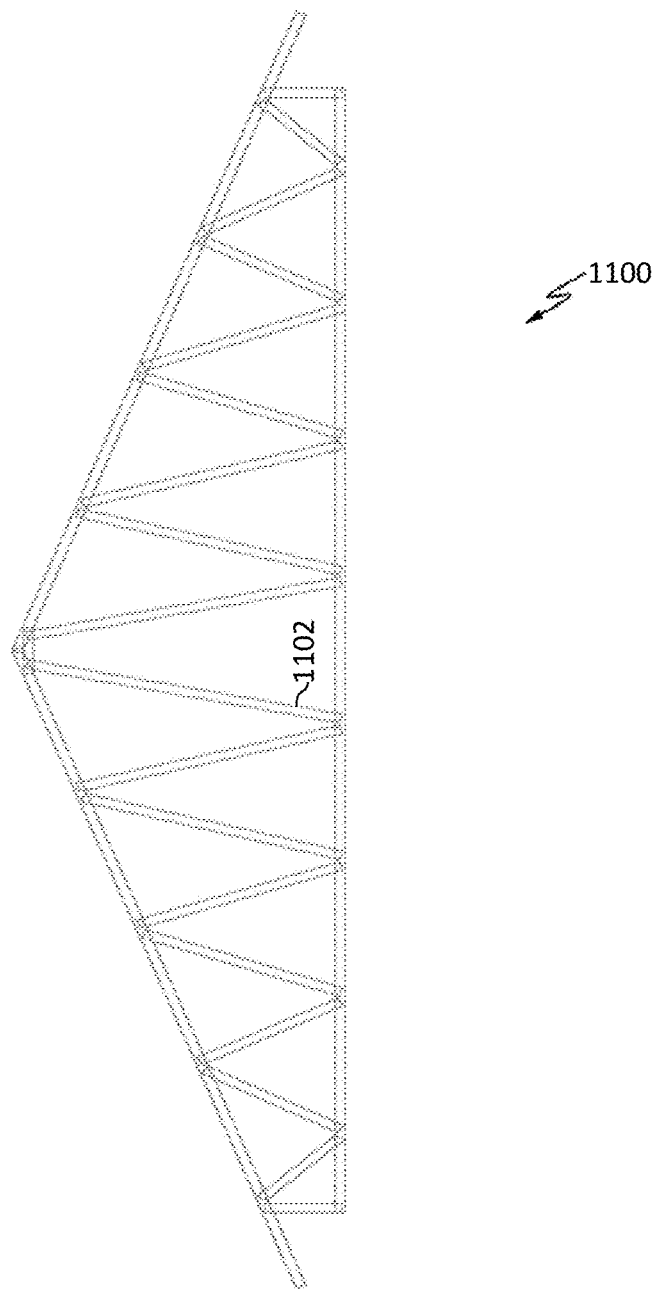
FIG. 11 depicts the truss from FIG. 9 in an assembled view, in accordance with one embodiment of the present invention.

Additionally, the optimization program 108 may also apply a set of members to the truss to generate an assembled version of the truss. Shown in FIG. 11 is a version of the truss from FIG. 9, where the truss is formed from a set of members which imitate how the truss would be created in the real-world. This includes the exterior members as well as the cross or interior members. In some embodiments, the optimization program may also alter or change the shape or design of the truss and shift the location, position, angle, and quantity of members within the truss. In some embodiments, the optimization program 108 is able to adjust the properties of each member (e.g. thickness, size, material, and the like). In some embodiments, the optimization program 108 is able to alter the orientation of the members from a weak axis to a strong axis. These axes have baring based on the type of member which is used. In the depicted embodiment and the following calculations, a cold formed c-channel steel member is used.

In step 406, the optimization program 108 calculates the weight of the trusses. Based on the creation of each truss (and potentially the creation of the members within the trusses), the optimization program 108 is able to calculate an estimate of the total weight of each truss and the roof layout as a whole. The calculation either collects data from the roof layout generated in the previous steps, from user input data, or from computer generated data for different designs. The data associated with the calculation can be, but not limited to, spacing of the trusses, the orientation of the members within the truss (weak vs. strong axis), the member thickness, the member profile, shipping limitations, and the like. Through the understanding of this data, the optimization program 108 is able to calculate the weight of each member, each truss, and the roof in its entirety. In some embodiments this calculation includes any fasteners, gusset plates, and the like to give a more accurate value to the overall weight of the roof. This calculation may be completed several times based on the member type, the member size, the truss spacing, and the orientation of the member. As shown in FIG. 12, an example of a spreadsheet of various weight calculations is shown for different sections of cold formed steel members. These are at different spacing and in different orientations (weak vs. strong). In this calculation, an estimate of the number of screws and gusset plates is also calculated based on known assembly methods and practices to form each truss. The highlighted sections are used to indicate a specific design which is selected in FIGS. 13 and 14 as well and is purely for exemplary purposes and not to emphasis one design over any others. FIG. 13 shows another embodiment of a spreadsheet.

In some embodiments, the optimization program 108 calculates the cross members and various designs of the cross members for each truss. As shown in FIG. 11, the truss is shown with a plurality of cross members 1102, which The quantity, position, and angle of the cross members may be predetermined or calculated in a variety of different setups to find an "ideal" position, where the truss is able to take a predetermined load with the minimal amount of cross members to create a truss that has the proper strength with the least weight.

In step 406, the optimization program 108 analyzes the trusses under various loads. The optimization program 108 applies various loads to the roof or individual trusses to determine the maximum loads. These loads are designed to replicate live and dead loads. For example, the optimization program 108 can analyze the roof with a load to replicate a foot of snow. In some embodiments, the optimization program 108 analyzes each individual truss based on the load applied. In other embodiments, the optimization program 108 applies the load over a set of trusses or a section of roof. This embodiment is designed to simulate the load applied with various roofing materials applied over the trusses to simulate real world scenarios. This step can be performed numerous times on one design to simulate various different loads.

In step 410, the optimization program 108 calculates the feasibility of the design. The feasibility of the design takes into account various aspects of the present design of the roof layout and the design and construction of each truss to determine a difficulty value. The difficulty value provides a value or set of values to assist a user in determining a roofing design or layout which meets their requirements or limitations. In one embodiment, the difficulty to construct values is calculated using the number of trusses which need to be built, the complexity of the profile of the trusses, the number of gusset plates required, the number of screws required, the member orientation (weak vs. strong) and the profile of each truss. Typically, with the design and installation of a roof, the lower the weight the better because it reduces the overall stress on the floors and structure below. However, with the lower weight typically comes a higher cost as either the material costs increase, or the construction costs increase due to the complexity of the design. In the alternative, a simpler roof design may have added weight but is less complex to construct. The feasibility calculation takes into account the applied loads to determine if the roof layout is able to withstand the desired loads to determine if the layout is even feasible. If it is not, the optimization program 108 may remove this from the potential roof designs.

Figure 15:
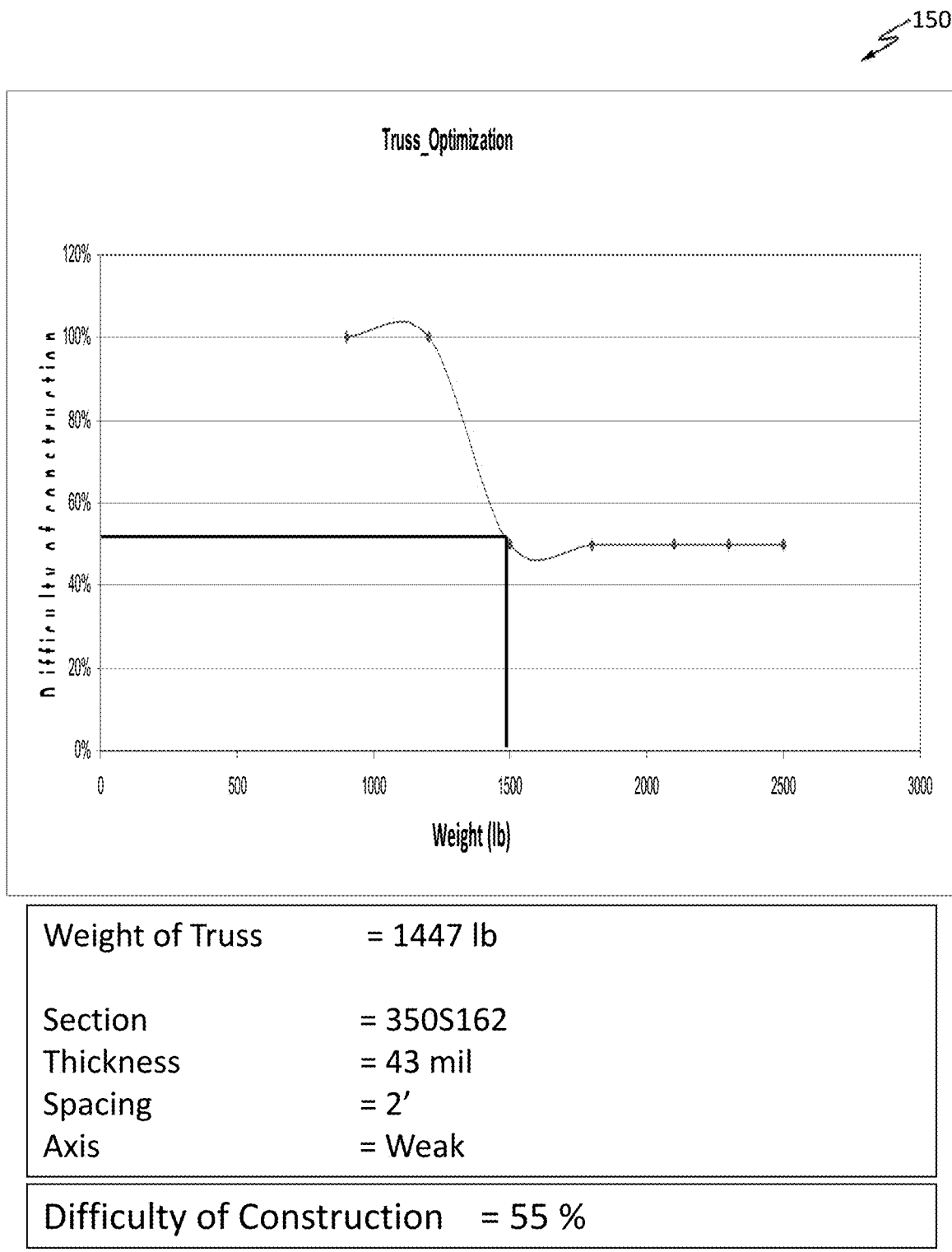
FIG. 15 depicts a graph and table showing a comparison of the weight and difficulty of construction, in accordance with one embodiment of the present invention.

As shown in FIG. 14, a table depicted the comparison of various roof layout designs is shown. The table shows a starting point where the "Saving (wt) (%)", "Saving (Gusset Plate (%)" and "Saving (Screw) (%)" are shown as "0" and all the following setups have values based an increase or decrease of the calculated weight, the number of gusset plates, and the number of screws needed for the construction of the design. These are shown as exemplary purposes and do not indicate a preferred roofing style over any other. The highlighted design shows a "set back" in the overall weight but an improvement in fewer gusset plates and screws which are required for the construction. This data is converted to a graph, shown in FIG. 15 to provide a visual representation of the difficulty of each design. As shown in the depicted illustration, each column from FIG. 14 is shown as a point on the graph, where the optimization program has calculated the difficulty of the design and plots that value relative to the overall weight of the design. As shown, in this embodiment, the lighter the roof layout, the more difficult the design, and at a certain point the difficulty levels off but the weight continues to increase. Based on the user's requirements they may select the design with the lowest weight and lowed difficulty of construction value indicated in the illustration with the two solid lines.

In additional embodiments, this score relates to the real-world difficulty to construct the roof using external factors such as cost of labor, shipping requirements and restrictions, location, etc. The optimization program 108, in some embodiments, remove roof layouts which are not feasible or exceed a difficulty to construct value that is over a predetermined threshold. Using integrated computer learning and machine learning technology, the optimization program 108 is able to For example, if the weight of the roof exceeds the weight the frame of the building can handle (or is likely able to handle), the feasibility of the design is unlikely, and a low score is applied. Additionally, if the number of trusses which is required to accomplish the creation of the roof is double or triple an "average" number, a lower feasibility score will be calculated because of the increase in material and the increase in construction costs. In another embodiment, if the roof is designed with fewer trusses but has an acceptable maximum load, has simple shaped trusses, the optimization program 108 is likely to give a high feasibility score of the design because of the decrease in material and construction requirements but the successful completion of the desired loads and design elements.

In step 412, the optimization program 108 generates the layout and design of each truss as shown in FIG. 11. This visual shows the cross members, and the design of each truss so that the construction workers are able to identify each truss and each truss member during the assembly process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalent.

What is claimed is:

1. A computer implemented method of design a roof, the method comprising:
    mapping, by one or more processors, a roof layout of a structure;
    identifying, by one or more processors, a set of features of the roof layout, wherein the set of features identifies slopes and intersections of surfaces of the roof layout;
    applying, by one or more processors, a plurality of trusses over the roof layout in a predetermined orientation, wherein the plurality of trusses are comprised of a plurality of members;
    altering, by one or more processors, a profile of each of the plurality of trusses based on the set of features of the roof layout;
    identifying, by one or more processors, the orientation of the plurality of members of the plurality of trusses;
    generating, by one or more processors, a profile of each of the plurality of trusses, wherein the profile is generated through the combination of the identified set of features of the roof layout and the orientation of the trusses;
    calculating, by one or more processors, a weight of the roof layout based on a total weight of the trusses; and
    calculating, by one or more processors, a difficulty rating of the roof layout, wherein the difficulty rating is based on the profile of the plurality of trusses, the orientation of the plurality of members of each truss, a position of the plurality of trusses, and the orientation of the plurality of members of the plurality of trusses.

2. The method of claim 1, further comprising, generating, by one or more processors, a set of illustrations of each truss of the roof layout.

3. The method of claim 1, wherein the generation of the profile of each of the trusses, further comprising, calculating, by one or more processors, a set of internal members of the truss.

4. The method of claim 1, wherein the calculating of the weight of the roof layout includes a quantity of fasteners and a quantity of gusset plates.

5. The method of claim 1, wherein the calculating of the weight of the roof layout includes an identification of a member type.

6. The method of claim 1, wherein the difficulty rating includes the orientation of the member types within the truss profile.

7. The method of claim 1, wherein the applying of the plurality of trusses over the roof layout includes a predetermined spacing between the trusses.

8. The method of claim 1, further comprising, applying, by one or more processors, a load to the roof layout, wherein the internal members of the truss are adjusted to compensate for the applied load.

9. The method of claim 1, wherein the calculating of the difficulty rating includes the quantity of gusset plates required for construction of the trusses and the number of trusses need to be constructed.

10. The method of claim 9, wherein the calculating of the difficulty rating includes the complexity of the profile of the trusses.

11. A system for creating a roof layout comprising:
    a CPU, a computer readable memory and a computer readable storage medium associated with a computing device;
    the computer program product comprising a computer readable storage medium having program instructions embodied therewith, the program instructions executable by a computing device to cause the computing device to:
    program instructions to map a roof layout of a structure;
    program instructions to identify a set of features of the roof layout, wherein the set of features identifies a slope and intersection of the surfaces of the roof layout;
    program instructions to apply a plurality of trusses over the roof layout in a predetermined orientation;
    program instructions to generate a profile of each of the plurality of trusses, wherein the profile is generated through the combination of the identified set of features of the roof layout and the orientation of the trusses;
    program instructions to apply a set of structural members to each truss, wherein the orientation of the set of structural members is based on a predetermined load;
    program instructions to manipulate the orientation of the set of structural members based on the predetermined load;
    program instructions to calculate a weight of the roof layout based on a total weight of the trusses; and
    program instructions to calculate a difficulty rating of the roof layout.

12. The system of claim 11, further comprising, program instructions to generate a set of illustrations of each truss of the roof layout.

13. The system of claim 11, wherein the calculating of the weight of the roof layout includes a quantity of fasteners and a quantity of gusset plates.

14. The method of claim 1, further comprising, manipulating, by one or more processors, manipulating the orientation the plurality of members based on a weak axis or a strong axis of the member.

15. The method of claim 14, further comprising, comparing, by one or more processor, the plurality of trusses based on the plurality of member orientations, wherein the plurality of trusses are compared based on strength.

16. The method of claim 1, wherein the mapping of the roof layout, further comprises, identifying, by one or more processors, a set of roof lines, wherein the roof line establishes a set of limitations of the plurality of trusses.

17. The method of claim 14, further comprising, comparing, by one or more processor, the plurality of trusses based on the plurality of member orientations, wherein the plurality of trusses are compared based on weight, truss spacing requirements, and quantity of fasteners.

18. A computer implemented method of design a roof, the method comprising:
   mapping, by one or more processors, a roof layout of a structure;
   identifying, by one or more processors, a set of features of the roof layout, wherein the set of features identifies slopes and intersections of surfaces of the roof layout;
   applying, by one or more processors, a plurality of trusses over the roof layout, wherein the plurality of trusses are positioned based on a predetermined orientation and spacing and the profile of the trusses is based on the set of features of the roof layout;
   incorporating, by one or more processors, a set of members into each truss, wherein the set of members each have a set of properties;
   manipulating, by one or more processors, the orientation of the set of members within each truss along a weak and strong axis of each member, wherein the manipulation of the members manipulates the spacing of the set of trusses and the profile of the trusses;
   establishing, by one or more processors, one or more roof designs based on the orientation of the set of members of each truss, wherein the weight and quantity of fasteners are identified; and
   calculating, by one or more processors, a difficulty rating of the roof layout, wherein the difficulty rating is based on a shape of the plurality of trusses, the orientation of the plurality of members of each truss, a position of the plurality of trusses, and the orientation of the plurality of members of the plurality of trusses.

* * * * *